United States Patent [19]

Dawson

[11] 4,284,126
[45] Aug. 18, 1981

[54] ENVIRONMENTAL CONTROL SYSTEM FOR A MULTIPLE ROOM STRUCTURE

[76] Inventor: N. Rick Dawson, 220 Fentress Blvd., Daytona Beach, Fla. 32014

[21] Appl. No.: 55,043

[22] Filed: Jul. 5, 1979

[51] Int. Cl.³ .................... F24F 3/00; G05D 23/19
[52] U.S. Cl. .............................. 165/11 A; 165/12; 165/22; 236/1 B; 236/51; 340/147 R
[58] Field of Search ............. 165/11, 12, 22; 62/126; 236/1 R, 1 C, 1 B, 46 R, 47, 51, 94; 340/147 R

[56] References Cited

U.S. PATENT DOCUMENTS

| | | | |
|---|---|---|---|
| 3,743,009 | 7/1973 | Dagerford | 165/11 |
| 3,933,197 | 1/1976 | Zimmer et al. | 165/22 X |
| 3,934,797 | 1/1976 | Perlmutter | 236/46 |
| 3,964,676 | 6/1976 | Rooks et al. | 236/46 R |
| 4,021,615 | 5/1977 | James et al. | 340/147 R |
| 4,060,123 | 11/1977 | Hoffman et al. | 165/11 |
| 4,132,355 | 1/1979 | Cleary et al. | 236/47 |
| 4,174,064 | 11/1979 | Pratt | 236/1 B |
| 4,213,562 | 7/1980 | Garrett et al. | 236/46 R |
| 4,215,408 | 7/1980 | Games et al. | 165/22 X |
| 4,223,831 | 9/1980 | Szarka | 236/47 |

Primary Examiner—Albert W. Davis
Assistant Examiner—Margaret A. Focarino
Attorney, Agent, or Firm—Duckworth, Hobby, Allen, Dyer & Pettis

[57] ABSTRACT

The environmental control system of the present invention is used in a multiple room structure which includes independently actuatable heating and cooling devices in each room. This system operates by monitoring the ambient air temperature in each room and by controlling the operation of each heating and cooling device to achieve a desired ambient air temperature in each room. The structure of the present invention includes a room status indicator which indicates the occupied or vacant status of each room. A centrally located control panel permits an operator to assign heating mode and cooling mode temperature limits to each room. A temperature sensing and control unit is positioned in each room and is coupled to the heating and cooling device in each room. The temperature sensing and control unit measures the ambient room air temperature, determines the operating mode of the heating and cooling device and controls the operating mode of the heating and cooling device in response to a control signal. A central processor is coupled to the room status indicator, to the control panel and to each of the temperature sensing and control units to continuously monitor and control the operation of each room heating and cooling device to achieve the desired ambient room air temperature in each room.

18 Claims, 3 Drawing Figures

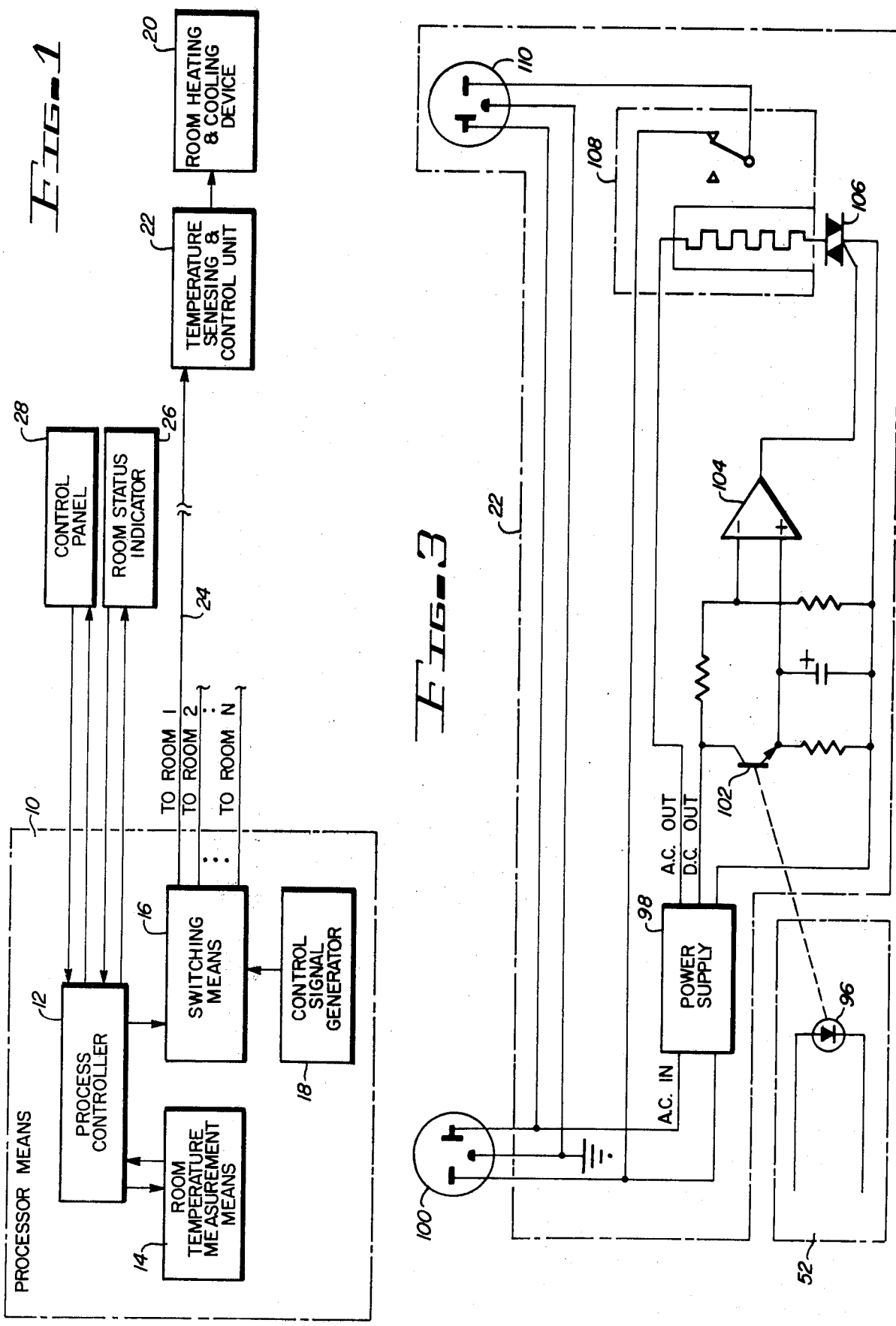

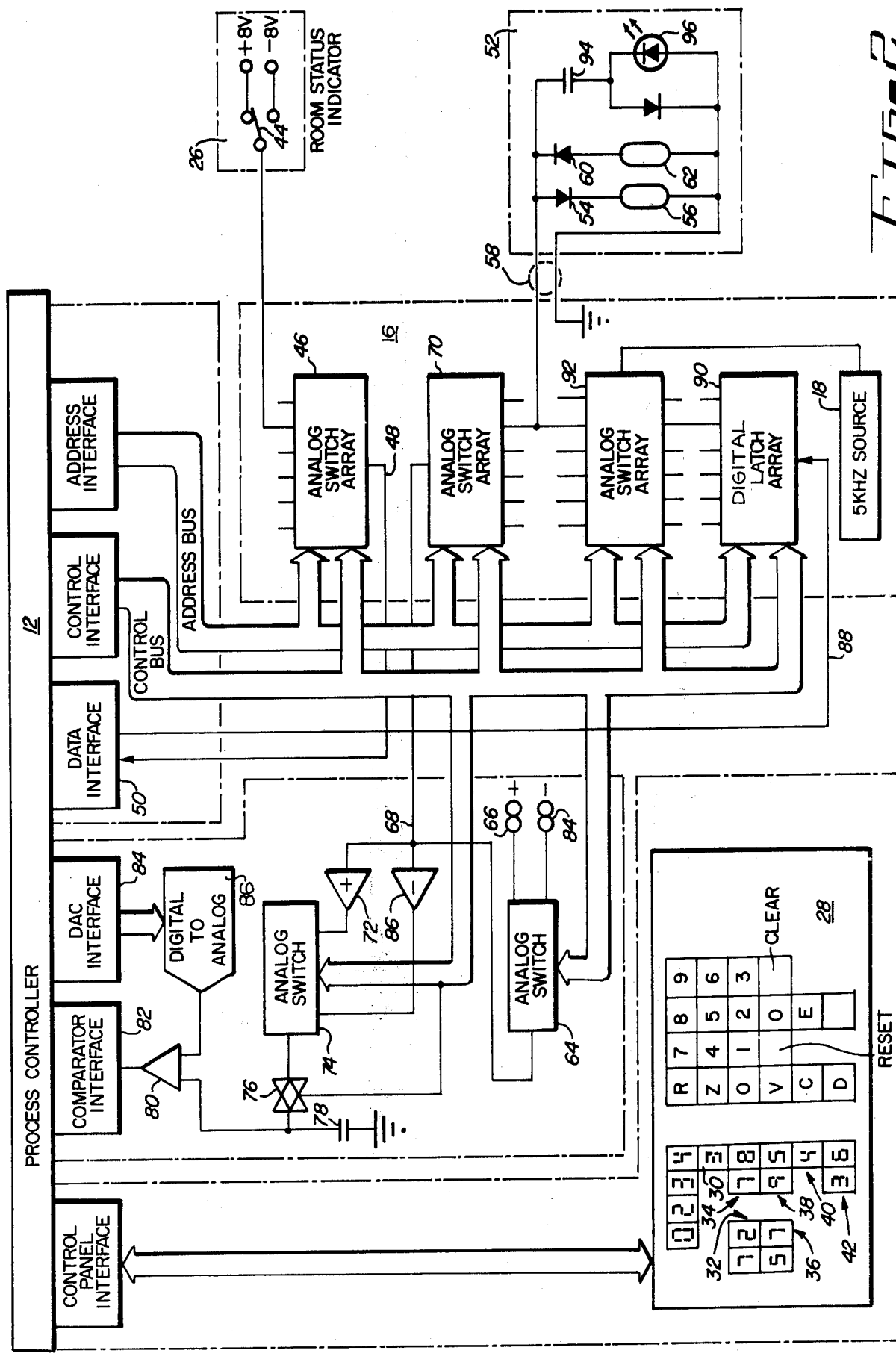

ENVIRONMENTAL CONTROL SYSTEM FOR A MULTIPLE ROOM STRUCTURE

BACKGROUND OF THE INVENTION

1. Field of the Invention

The present invention relates to environmental control systems, and more particularly, to environmental control systems for multiple room structures having independently actuatable heating and cooling devices in each room.

2. Description of the Prior Art

The prior art discloses a wide variety of devices intended for use in multiple room structures such as hotels and motels and which reduce the heating or cooling load in unoccupied guest rooms. This reduction in heating and cooling load is accomplished by permitting the room temperature in unoccupied rooms to rise above the comfort level when the environmental control system is in the cooling mode and by permitting the temperature in unoccupied rooms to decrease below the comfort level when the environmental control system is in the heating mode.

U.S. Pat. No. 4,060,123 (Hoffman) discloses a device of the type described above which overrides the room heating and cooling unit thermostat to cause the room temperature to increase or decrease to an energy saving temperature when the room occupant removes the room key from the room control unit.

U.S. Pat. No. 4,021,615 (James) discloses an energy conservation system which enables a room clerk to transmit an audio tone over the telephone lines into each vacant guest room to turn off the room heating and cooling device. This system also permits a room clerk to turn on a room heating and cooling device just before the room is to be occupied. The James system is a passive system in that no information is transmitted from the room to the central control unit.

U.S. Pat. No. 3,934,797 (Perlmutter) discloses a temperature control system which incorporates a pair of thermostatically controlled switches within each room of a multi-room structure. One thermostat permits a first predetermined temperature to be maintained if a room is occupied while the second thermostat permits the room temperature to be maintained at a second level when the room is unoccupied. A clock controls the selection of one of the two thermostats and thus designates when the "occupied" thermostat will be actuated and when the "unoccupied" thermostat will be actuated.

U.S. Pat. No. 3,964,676 (Rooks) discloses an electronic morning start-up control for a building temperature control system. A cyclic clock starts a fixed period auxillary timer a predetermined time before building occupancy is to commence to permit the building temperature to be raised or lowered to a predetermined level by the time occupancy commences.

U.S. Pat. No. 3,945,564 (Smallegan) discloses a temperature control system which provides an automatic reduction in room temperature during night time hours.

U.S. Pat. No. 4,031,322 discloses a telephone operated signalling system which utilizes the twin conductor telephone wires which extend between the front desk of a motel or hotel and each individual room. This system permits maids and other employees to transmit signals to the front desk during clean up activities.

Other related inventions are disclosed in the following U.S. Pat. Nos.: 3,908,899 (Millard); 3,743,009 (Dagerford) and 3,933,197 (Zimmer et al).

SUMMARY OF THE INVENTION

The present invention contemplates an environmental control system for a multiple room structure having an independently actuatable heating and cooling device in each room. This system operates by monitoring the ambient air temperature in each room and by controlling the operation of each room heating and cooling device to achieve a desired ambient air temperature in each room.

The inventive system comprises a room status indicator which indicates the occupied or vacant status of each room. A control unit permits an operator to assign heating mode and cooling mode temperature limits to each room. A temperature sensing and control unit is positioned in each room and is coupled to the heating and cooling device in each room. This unit measures the room air temperature and permits a determination to be made as to the operating mode of the heating and cooling device. This unit additionally controls the operating mode of the heating and cooling device in response to a control signal. Processor means is coupled to the room status indicator, to the control panel and to each of the temperature sensing and control units in order to determine the desired ambient room air temperature for each room and to transmit an appropriate control signal to each temperature sensing and control unit. The environmental control system of the present invention is thus able to continuously control each of the room heating and cooling devices to achieve the desired ambient room air temperature in each room.

DESCRIPTION OF THE DRAWINGS

The invention is pointed out with particularity in the appended claims. However, other objects and advantages together with the operation of the invention may be better understood by reference to the following detailed description taken in connection with the following illustrations wherein:

FIG. 1 is a generalized block diagram of the various elements of the preferred embodiment of the present invention.

FIG. 2 is a detailed block diagram of a part of the preferred embodiment of the present invention.

FIG. 3 is a detailed block diagram of the remaining elements of the preferred embodiment of the present invention.

DESCRIPTION OF THE PREFERRED EMBODIMENT

In order to better illustrate the advantages of the invention and its contributions to the art, a preferred hardware embodiment of the invention will now be described in some detail. FIG. 1 is a general level block diagram of the system of the present invention while FIGS. 2 and 3 illustrate the specific structure which comprises the environmental control system of the present invention.

Processor means 10 is the primary active element of the environmental control system and includes process controller 12, room temperature measurement means 14, switching means 16 and control signal generator 18. Each room in the multiple room structure controlled by the environmental control system of the present invention includes a room heating and cooling device 20 and a temperature sensing and control unit 22. The temperature sensing and control unit 22 measure the ambient room air temperature, assists in determining the operating mode of the heating and cooling device and controls the operation of heating and cooling device 20 in response to a control signal. A two conductor wire 24 couples switching means 16 of processor means 10 to the temperature sensing and control unit 22 which is positioned within each separate room of the structure.

Room status indicator 26 is coupled to process controller 12 and indicates to process controller 12 the occupied or vacant status of each room controlled by the system. Control panel 28 permits an operator to control and modify the operation of the system and to determine the preset temperature limits assigned to any particular room. Control panel 28 also displays other data and permits other types of inputs to the system which will be discussed below.

Referring now to FIG. 2, the specific structure utilized in the preferred embodiment of the invention will be discussed in some detail. The following discussion will assume that the environmental control system of the present invention is installed in a multi-unit motel or hotel and that control panel 28 is positioned at the check-in desk. Control panel 28 will normally include a lock out device which prevents non-supervisory personnel from substantially modifying the operation of the system. Supervisory personnel will be issued a key or equivalent device which will disable the lock out device and permit full control over the system through the keyboard of control panel 28.

The operator of control panel 28 initially depresses the "R" key and then depresses a sequence of digital keys representative of the room number which he wishes to modify or evaluate. In FIG. 2, the operation of the heating and cooling device in room 234 is to be modified or evaluated. Once the room number has been identified, process controller 12 will transmit a sequence of data to control panel 28 which will be displayed on the remaining LED displays immediately below the room number read out.

LED display 30 indicates that room number 234 has been assigned to zone 3. If the operator wishes to assign room 234 to a different zone, he must depress key "Z" and then the numeral key corresponding to the desired zone number. Each room can in this manner be independently assigned to different heating and cooling zones which have various temperature limits as is discussed below. Corner rooms, rooms having a northern exposure, rooms exposed to the prevailing wind, rooms receiving the afternoon sun, or rooms on the interior of the building can each be independently assigned to a different zone which will maximize the effectiveness of the operation of the heating and cooling system controlled by the environmental control system of the present invention.

The next level of the LED display designated by reference numerals 32 and 34 indicates the peak heating temperature and the minimum cooling temperature of an occupied room in zone 3. Similarly, LED displays 36 and 38 indicate the maximum heating limit and minimum cooling limit for a vacant room in zone 3. If the operator wishes to reprogram any of these limits he depresses either the "O" or "V" keys and appropriate numeral keys on control panel 28 which enables the reprogramming of the occupied and vacant temperature limits displayed on LED displays 32, 34, 36 and 38.

The heating and cooling temperature limits discussed above cause the room temperature in a room in zone 3 to be maintained at a temperature no higher than 72 degrees when the environmental control system is in the heating mode and the room is occupied and at a temperature no higher than 57 degrees when the system is in the heating mode and the room is unoccupied. In a corresponding manner, when the system is in a cooling mode, a room in zone 3 is cooled to a temperature no lower than a temperature of 78 degrees when it is occupied and to a temperature no lower than 95 degrees when the room is vacant. The numbers shown on control panel 28 of FIG. 2 are representative only, can be readily modified as described above and are independently controllable for each zone to which a particular room is assigned.

LED display 40 indicates the check-in delay time in hours. The check-in delay temporarily modifies the heating and cooling temperature limits in an occupied room at the rate of 2° F. per hour for a predetermined designated time immediately following the time when a guest checks into the room. The numeral "4" displayed on display 40 indicates that a check-in delay of four hours has been assigned to all rooms in zone 3. During the initial portion of this four hour check-in delay, the occupied heating limit is raised eight degrees to 80 degrees and the occupied cooling limit is lowered eight degrees to 70 degrees. These modified limits are reduced one degree per half hour and at the end of four hours will have been brought to the normal limit indicated on the display panel. This initial eight degree temperature limit modification permits the room temperature to stabilize during the heating or cooling period initially following check in, prevents erratic operation of the system and obtains comfortable temperatures in the room in a minimum period of time. The "C" key permits reprogramming of the check in delay time and therefore the magnitude of the initial temperature limit change.

LED display 42 displays a number representative of the desired percentage reduction in peak power demand by the environmental control system. Since power companies charge commercial customers partially on the basis of peak electrical load, substantial economies can be realized for a commercial user if the peak demand can be reduced. In a hotel having 100 separate rooms, it would normally be possible for as many as 100 of the room heating and cooling devices to be operating simultaneously. If this occurred once during the period of a single month, the surcharge charged by the utility company for this peak demand would significantly affect the electrical bill for the hotel. The system of the present invention by actively limiting the maximum number of room heating and cooling devices which can operate at any one time can substantially limit the peak demand.

Led display 42 displays a number which corresponds to the percentage demand saving which is desired. A desired savings of 25% will indicate to process controller 12 that no more than 75 of the hotel's 100 room heating and cooling devices must be permitted to operate at any one time. This objective is achieved by sequentially shutting down the room heating and cooling devices in selected rooms for a period of time such as five minutes each when the ambient outside temperature is either extremely high or extremely low and more than 75 percent of the system heating and cooling devices would otherwise be activated. After the five minute shut down interval which is applied to any selected room has expired, the device resumes normal operation until a device in each room has been cycled off for five minutes. Thus for a one hundred room system, only seventy five of the room heating and cooling devices are permitted to operate at any one time. In the preferred embodiment of the present invention, the "fan only" mode of operation of the room heating and cooling device is not affected by the demand limit function described above.

Only as many rooms as necessary to satisfy the required demand reduction are shut off as described above. If, at any given time, 20 rooms, for instance, were not operating for any reason. Then, in the example above, only 5 additional rooms would need to be shut off. Rooms counted as not operating would include both those shut off in the room by controls inherent in heating and cooling device 20 and those shut off by the present invention because of excessive ambient air temperature.

The "E" key eliminates a selected room from system control and permits the room heating and cooling device to be directly controlled by the guest. When the guest checks out and the selected room assumes the "vacant" status, the normal temperature limits are reapplied to that particular room. The "E" key is the only programming key which can be operated by non-supervisory personnel such as a room clerk. A room clerk is able to actuate the displays of control panel 28 but is not otherwise able to reprogram the data displayed.

The occupied or vacant status of each room can be communicated to process controller 12 by a management computer if the hotel has such a device which maintains an updated room status condition. In the preferred embodiment of the present invention, a separate status indicator panel is provided and includes a single pole double throw switch 44 which is assigned to each room and actuated by the room clerk. One position of this switch corresponds to a vacant status. A plus or a minus eight volt electrical signal is transmitted by a conductor to N-position analog switch array 46. In the position indicated in FIG. 2, a plus eight volt signal will be coupled through switch array 46 to conductor 48 which transmits this signal to data interface 50 of process controller 12. When processor controller 12 reads the plus eight volt signal corresponding to the selected room, the occupied or vacant status of the selected room is readily determined. The plus eight volt signal from switch 44 will not actually be connected to electrical conductor 48 until the control bus transmits an appropriate control signal to the control input of switch array 46.

The ambient room air temperature and operating mode of heating and cooling device 20 in each room is determined with the assistance of the electrical components shown in the block designated by reference number 52 in FIG. 2. This circuitry represents a portion of temperature sensing and control unit 22 illustrated in FIG. 1.

Semiconductor diode 54 and thermistor 56 are coupled as shown across two conductor cable 58. Similarly, semiconductor diode 60 and thermistor 62 are coupled across cable 58 with a reverse polarity as illustrated. Thermistor 56 is placed in the conditioned air output duct of heating and cooling device 20 while thermistor 62 is placed in the input or return air duct of heating and cooling device 20. The resistance of thermistor 56 is thus inversely related to the temperature of the ouput air of heating and cooling device 20 while the resistance of thermistor 62 is inversely related to the ambient room air temperature.

To measure the output air temperature of heating and cooling device 20, the control bus of process controller 12 actuates analog switch 64 to couple positive constant current source 66 to conductor 68 which is coupled to the input of N position analog switch array 70. The address bus coupled to process controller 12 selects the switch within analog switch array 70 which corresponds to the particular room being evaluated by the system. When an appropriate signal is transmitted from the control bus to switch array 70, the addressed switch is closed and the current impressed on conductor 68 is coupled to conductor 58. A predetermined known current flow is thus established from positive constant current source 66 through diode 54 and thermistor 56. The approximately 2500 to ten thousand ohm resistance of thermistor 56 predominates over the other resistances such as the resistance of conductor 58 and generates a voltage which is amplified by non-inverting voltage amplifier 72. The control bus actuates analog switches 74 and 76 to momentarily couple the amplified voltage output from amplifier 72 to capacitor 78. The foregoing electrical components constitute a sample and hold circuit. The voltage on capacitor 78 is coupled to one input of voltage comparator 80. The output of voltage comparator 80 is coupled through a comparator interface 82 to process controller 12. The output of digital to analog interface 84 is coupled to the input of digital to analog converter 86. The output of this digital to analog converter is coupled to the second input of voltage comparator 80. Process controller 12 controls the operation of digital analog converter 86 through the feedback path established through voltage comparator 80 to reach a successive approximation measurement of the voltage existing on capacitor 78. In this manner the voltage generated by the current flow through thermistor 56 is accurately measured. After the initial circuit calibration and since the resistance of thermistor 56 is the only circuit variable, the voltage measured by process controller 12 corresponds to the temperature of the output air from room heating and cooling device 20.

To measure the room ambient air temperature, analog switch 64 is actuated by the control bus to couple negative constant current source 84 through analog switch array 70 to conductor 58. As a result of the polarity of diode 60, current is permitted to flow only through thermistor 62. The voltage generated by this constant current flow is amplified by inverting voltage amplifier 86 and the magnitude of this voltage is measured in a manner identical to that described previously in connection with the voltage output of non-inverting voltage amplifier 72.

By alternately measuring the voltages produced by the temperature variable resistances of thermistors 56 and 62, process controller 12 is able to determine the ambient room air temperature in a selected room designated by its address bus and is also able to determine whether the output air flow from the room heating and cooling device 20 is greater than or less than ambient room temperature. An output air temperature from heating and cooling device 20 significantly higher than the ambient room temperature corresponds to the system heating mode while an output air temperature significantly lower than the ambient room air temperature corresponds to the system cooling mode. If the ambient room air temperature and the output air flow temperature are substantially the same, either an "off" condition or the "fan only" condition is indicated in which the heating and cooling device blower motor is operating but the unit is neither heating nor cooling.

When process controller 12 determines that the desired temperature limit has been exceeded in the room which it is currently addressing, process controller 12 transmits an output signal through data interface conductor 88 which sets a digital latch assigned to the addressed room in N-bit digital latch 90. This high binary output on the addressed digital latch is coupled to a control input of a corresponding analog switch in analog switch array 92 causing it to assume a closed position. A 5 KHz audio frequency generator 18 is coupled to a common switch terminal of each switch element within analog switch array 92. The closure of the single pole single throw switch in analog switch array 92 which corresponds to the room addressed by process controller 12 couples the 5 KHz audio frequency signal from control signal generator 18 through conductor 58 to temperature sensing and control unit 22. This 5 KHz A.C. signal passes through capacitor 94 and illuminates LED 96. LED 96 is optically coupled to control circuitry which will be described below and causes the room heating and cooling device to which it is coupled to be de-energized. Process controller 12 controls the timing of switching means 16 so that current generated by current sources 66 and 84 is not present on conductor 58 simultaneously with the 5 KHz audio frequency signal generated by control signal generator 18.

Process controller 12 generates control bus signals which cause the system to first measure the resistance of thermistor 56, next to measure the resistance of thermistor 62, and determine, from memory, the occupied or vacant condition of the room, and, finally, determine if that room has exceeded the appropriate limit. Before this process is begun, process controller 12 first inputs the occupied or vacant condition of each room as previously described, and stores such condition in memory. The sequence just described is then repeated for each room. Finally, the appropriate control signals are transmitted to each room.

Referring now to FIG. 3, that portion of the circuitry of temperature sensing and control unit 22 which actually energizes and de-energizes heating and cooling device will be described. Power supply 98 is connected by plug 100 to a source of A.C. line voltage and converts this A.C. line voltage into a lower voltage D.C. output to a 24 V.A.C. control voltage. A phototransistor 102 is coupled to the D.C. output of power supply 98 and is optically coupled to the output of LED 96. When LED 96 is energized, phototransistor 102 is turned on. The output from the emitter of phototransistor 102 is amplified by amplifier 104 and the output signal from amplifier 104 switches on triac 106. Triac 106 and a thermal delay relay 108 are coupled across the A.C. output of power supply 98. Thermal delay relay 108 includes a set of normally closed contacts which are actuated from the normally closed to the open position approximately 30 seconds after the A.C. voltage is applied to the heating element of thermal delay relay 108 by the actuation of triac 106. The thermal delay relay 108 controls the operation of heating and cooling device 20 by applying and removing A.C. line voltage from output plug 110 as illustrated.

Process controller 12 controls the operation of temperature and sensing in control unit 22 so that LED 96 is never turned off for a period of less than two minutes. As a result of the thirty second thermal delay, heating and cooling device 20 will thus always be energized for a minimum 1½ minute time period and will cool or heat for this minimum period of time. Process controller 12 will not begin sensing temperatures in a room until the heating and cooling device has been operating for the minimum time interval. Since temperature readings are taken only from rooms in which LED 96 has been in the off condition for more than two minutes, the circuitry of the present invention will never sample the 5 KHz tone since it is utilized solely to turn off or de-energize heating and cooling device 20.

An abbreviated operational sequence for a single room occurs in the following steps.

1. Address a specific room.
2. Output the latch in latch array 90 low to permit heating and cooling device 20 to operate.
3. Delay two minutes to allow the time delay relay 109 to be de-energized and for conditions to stabilize.
4. Address analog switch array 70 to the appropriate room.
5. Apply positive constant current.
6. Wait for voltage to stabilize.
7. Sample voltage on line conductor 48.
8. Measure voltage using successive approximation method.
9. Convert voltage to an outflow air temperature measurement.
10. Apply negative constant current.
11. Permit voltage to stablize.
12. Sample voltage on line conductor 58.
13. Measure voltage by successive approximation method.
14. Convert voltage measurement to ambient room air temperature.
15. Determine operating mode of heating and cooling device 20 (heat/cool/fan only) by comparing measured temperatures.
16. Determine occupied or vacant status from memory.
17. Determine zone assignment from memory.
18. Determine appropriate temperature limit for designated zone from memory.
19. Compare measured room ambient air temperature to indicated temperature limit.
20. If appropriate, output appropriate latch in latch array 90 to activate LED 96 to turn off heating and cooling device 20.
21. If this sequence did not result in turning off the heating and cooling device 20, then repeat steps 4 through 20. If this sequence did result in turning off heating and cooling device 20, then wait 10 minutes if room is occupied, or wait 120 minutes if room is vacant, and repeat steps 1 through 20.

The specific electronic structure of electronic circuit elements such as process controller 12 has not been disclosed in precise detail since these details are well known to those skilled in the art. In the preferred embodiment, A Motorola MC6802 microprocessor constitutes the central processing unit and scratch pad random access memory. Additional random access memories and read only memories are incorporated within the system and the selection and connection of these elements is well known to those skilled in the art. Sufficient disclosure has been recited above to enable a computer programmer of ordinary skill in the art to readily draft a program corresponding to the process steps described above. Motorola MC14051B devices are used for analog switch array 46 and 70; Motorola MC14066B devices are used for analog switch array 92; and Motorola MC14099B devices are used for digital latch array 90.

In many installations the heating and cooling device located in each room may also include a thermostat which formerly controlled the operation of the device in both the heating and cooling modes. When the present invention is coupled to a unit of this type, the system of the present invention and the heating and cooling device thermostat effectively operate in series so that when the environmental control system is in the cooling mode, the heating and cooling device thermostat will permit a room occupant to select a temperature on the thermostat higher than a centrally assigned room temperature limit. For example, if an occupied room has a cooling mode temperature limit of seventy-eight degress, the room occupant may set his room thermostat to a temperature of eighty degrees and maintan the eighty degree temperature or any other temperature which is higher than the cooling mode temperature limit of seventy-eight degrees. Similarly, when the environmental control system is in the heating mode, the heating and cooling device thermostat may be set to permit a room occupant to maintain a lower temperature than the heating mode temperature limit designated by the centrally located control panel.

In another embodiment of the present invention for use in a multi-unit apartment complex or in a multi-room office building, the room status indicator may be deleted from the system since the occupied or unoccupied status of each apartment or each office will not change on a frequent basis. In this embodiment, different temperature limits may be assigned to vacant apartments or unoccupied office space by merely assigning those areas to a zone having the desired temperature limits. Thus the room status indicator element is not required for these particular uses.

It will be apparent to those skilled in the art that the disclosed environmental control system may be modified in numerous ways and may assume many embodiments other than the preferred form specifically set out and described above. For example, far more sophisticated signalling systems could be incorporated for transmitting signals over line conductor 58 between processor means 10 and temperature sensing and control unit 22. Thus numerous additional control functions could be accomplished with only minimal modifications of the circuitry of the preferred embodiment. Room status indicator panel 26 may not be necessary if the particular user already possesses a management computer system which maintains current room status data. In this embodiment, an appropriate output of the management computer would be coupled directly to process control 12 and would thereby indicate the present room status at all times. Control panel 28 might also be modified to include an additional read out which would indicate to a room clerk the present temperature in each room. The operating sequence of the environmental control system of the present invention could be modified in many different ways while still remaining within the scope of the invention. Accordingly, it is intended by the appended claims to cover all such modifications which fall within the true spirit and scope of the invention.

I claim:

1. An environmental control system for a multiple room structure having an independently actuatable heating and cooling device in each of said rooms, said system operating by monitoring the ambient air temperature in each of said rooms and controlling the operation of each of said heating and cooling devices to achieve a desired ambient air temperature in each of said rooms, said system comprising:
    a. a room status indicator for indicating the occupied or vacant status of each of said rooms;
    b. a control unit for permitting an operator to assign heating mode and cooling mode temperature limits to each of said rooms;
    c. a temperature sensing and control unit positioned in each of said rooms and coupled to said heating and cooling device in each of said rooms for measuring the ambient room air temperature and determining the operating mode of said heating and cooling device, and for controlling the operating mode of said heating and cooling device in response to a control signal, said temperature sensing and control unit including first temperature measurement means for measuring the ambient air temperature in said room and second temperature measurement means for measuring the temperature of the conditioned air discharged from said heating and cooling device; and
    d. processor means coupled to said room status indicator, to said control unit and to each of said temperature sensing and control units for determining the desired ambient room air temperature for each room and for transmitting an appropriate control signal to each of said temperature sensing and control units to continuously control each of said heating and cooling devices to achieve the desired ambient room air temperature in each of said rooms.

2. The system of claim 1 wherein a single electrically conductive path couples each of said temperature sensing and control units to said processor means.

3. The system of claim 2 wherein said electrically conductive path includes a twin conductor wire.

4. The system of claim 1 wherein the heating and cooling device in each of said rooms includes an intake port for receiving ambient air from said room and an exhaust port for discharging conditioned air into said room.

5. The system of claim 4 wherein said first temperature measurement means is positioned in said intake port of said heating and cooling device and wherein said second temperature measurement means is positioned in the exhaust port of said heating and cooling device.

6. The system of claim 1 wherein said first and second temperature measurement means include first and second thermistors.

7. The system of claim 6 wherein each of said temperature sensing and control means is coupled to said processor means by a single twin conductor wire.

8. The system of claim 7 wherein said first thermistor is coupled in series with a first diode oriented in a first direction and with said twin conductor wire and wherein said second thermistor is coupled in series with a second diode oriented in a second direction and with said twin conductor wire.

9. The system of claim 8 wherein said processor means includes means for alternately transmitting an electrical signal current in first and second directions through selected ones of said twin conductor wires to alternately measure the resistance of said first and second thermistors in selected temperature sensing and control means.

10. The system of claim 9 wherein said electrical signal transmitting means transmits direct current in first and second directions through selected ones of said twin conductor wires.

11. The system of claim 9 wherein said electrical signal transmitting means transmits a D.C. voltage in first and second directions through selected ones of said twin conductor wires.

12. The system of claim 1 wherein each of said temperature sensing and control units includes control means for selectively operating said room heating and cooling device in response to the control signal generated by said processor means.

13. The system of claim 12 wherein said control means includes switch means for selectively connecting and disconnecting a source of electrical power from said room heating and cooling device.

14. The system of claim 1 wherein said processor means includes:
 a. a process controller for controlling the operation of said system; and
 b. switching means coupled to said process controller and to each of said temperature sensing and control units for selectively addressing a predetermined temperature sensing and control unit designated by said process controller.

15. The system of claim 14 wherein said processor means further includes room temperature measurement means coupled to said process controller and to said switching means for transmitting an electrical signal through said switching means to said temperature sensing and control unit addressed by said switching means to alternately measure the ambient room air temperature in said designated room and the temperature of the conditioned air in said designated room.

16. The system of claim 15 wherein said room temperature measurement means includes voltage measurement means.

17. The system of claim 1 wherein said processor means is a digital computer.

18. The system of claim 1 wherein said room heating and cooling device includes a thermostat and wherein said processor means continuously controls each of said heating and cooling devices to prevent operation of said heating and cooling devices beyond a predetermined ambient room air temperature limit.

* * * * *